Aug. 15, 1950     L. J. WEBER     2,518,842
MEANS FOR SECURING EVEN DISTRIBUTION OF HEATED PEBBLES
IN THE PRODUCT HEATING CHAMBER OF A PEBBLE FURNACE
Filed Dec. 9, 1946     2 Sheets-Sheet 2
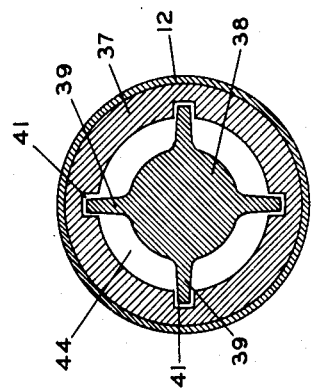
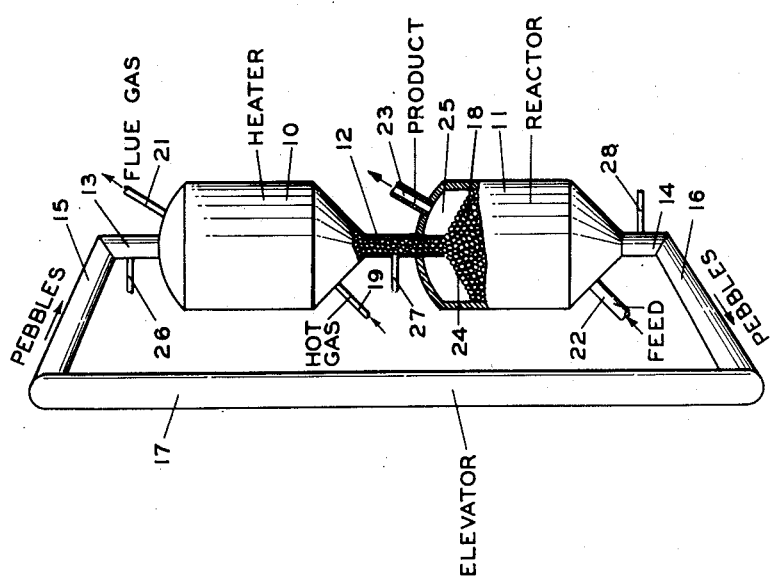
INVENTOR
L. J. WEBER
BY *Hudson & Young*
ATTORNEYS Patented Aug. 15, 1950

2,518,842

UNITED STATES PATENT OFFICE 2,518,842

MEANS FOR SECURING EVEN DISTRIBUTION OF HEATED PEBBLES IN THE PRODUCT HEATING CHAMBER OF A PEBBLE FURNACE

Louis J. Weber, Bartlesville, Okla., assignor to Phillips Petroleum Company, a corporation of Delaware Application December 9, 1946, Serial No. 715,075

9 Claims. (Cl. 23—284)

This invention relates to an improvement in pebble heater type apparatus. A specific aspect of the invention pertains to improved flow of pebbles thru the throat connecting the upper and lower chambers of a pebble heater apparatus.

Pebble heater operation has been applied to a wide variety of processes where rapid heating to high temperatures is required. In this type of operation a continuous mass of highly refractory pebbles descends by gravity thru a series of chambers picking up heat from combustion gas in an upper chamber and delivering the heat required for heating and/or chemical reaction in a lower chamber. In descending from the heating chamber to the reaction chamber, the pebble stream passes thru a relatively narrow neck connecting the two chambers. This neck or throat is designed narrow in order to facilitate the prevention of mixing of gases in the reaction chamber with those in the pebble heating chamber. This narrowing of the pebble throat introduces two disadvantages. In the first place, a narrow throat adversely effects the uniformity of flow of the pebble bed thru the pebble heating chamber which results in overheating of some of the pebbles and underheating of others. It has also been observed that the narrower the throat, the longer the slope of the top of the pebble bed in the reactor below and the more nearly it approaches a cone. This results in a greater distance of flow of reactants thru the pebble bed in the reactor near the center of the bed and a shorter distance for reactants passing thru the bed near the periphery thereof. The ideal situation for uniform flow of gases thru the pebble bed in the reactor is a perfectly horizontal pebble bed surface. However, this is practically impossible to obtain. Unequal contact time of the reactants with hot pebbles in the reactor results in lower yield of the product desired since a specific reaction time is conducive of the best yield.

It is an object of the present invention to provide a more uniform flow of pebbles thru a pebble heating chamber. Another object of the invention is to flatten out the pebble bed top surface in the reaction chamber. A further object of the invention is to provide a device which will permit less diffusion of flue gas and product gases in the upper and lower chambers. Other objects will become apparent from the accompanying disclosure.

My invention utilizes a throat plug in the throat between the heating chamber and the reactor, which makes it possible to use a much larger throat than is conventional and still reduce the diffusion of gases between the chambers. It can easily be seen that the use of a wider throat has a flattening effect upon the top surface of the pebble bed in the reactor. The provision of an annular space between the throat plug and the interior walls of the throat permits adequate pebble flow for all types of processes and effective gas sealing means between the two chambers. The width or diameter of the plug and the width or diameter of the throat should be correlated to provide a pebble flow space between the plug and throat sufficient at least to accommodate the maximum flow of pebbles required in any process for which the pebble heater installation is designed. The practical limits for the diameter of the plug are from $\frac{1}{2}$ to $\frac{1}{10}$ of the diameter of the pebble heater reactor. The practical limits for the diameter of the throat are expressed by the following equation:

$$D_i + 2(3P \text{ to } 20P) = D_o$$

where $D_i$ represents the diameter of the inserted plug, $D_o$ represents the diameter of the throat and $P$ represents the diameter of the pebbles. An annulus in the throat of from 3 to 20 pebble diameters in cross section will provide adequate pebble flow in all types of processes, and still permit the prevention of any material amount of mixing of the gases between the two chambers. Designing the throat larger than the limitation on its inside diameter is not practical since the uniform flow of gases thru the pebble bed in the reactor is unduly hampered thereby.

The throat plug is desirably designed to extend the entire throat length, but it may be designed shorter and still obtain advantages of the invention. The plug must be supported in fixed relation to the walls of the throat.

The term pebble as used thruout this specification denotes any solid refractory contact material of flowable form and size. Pebbles are preferably substantially spherical and relatively uniform in size, but may be rod shaped or irregular in shape and/or size. Approximate spheres of about $\frac{1}{8}$ inch to 1 inch in diameter function desirably and those of about $\frac{1}{4}$ to $\frac{1}{2}$ inch are most practical. Since the pebble heater has its greatest applicability to processes in which the reactor temperature is above 1300° F., pebbles must be designed of material that will withstand extremely high temperatures. In some hydrocarbon cracking processes pebbles must withstand temperatures as high as approximately 3000° F. Practical materials for pebbles include alumina, berylia, zirconia, thoria, mullite, periclase, silicon carbide, natural and synthetic clays, etc. Metal and alloy balls function well in some processes. The pebbles may be catalytic or relatively noncataytic depending upon the process in which they are used.

The invention will be more clearly understood by reference to the following detailed description and to the drawing of which—

Figure 2 is an elevational view partly in section showing a conventional pebble heater installation.

Figure 3 is a cross section taken on the line 3—3 of Figure 1.

Figure 1:
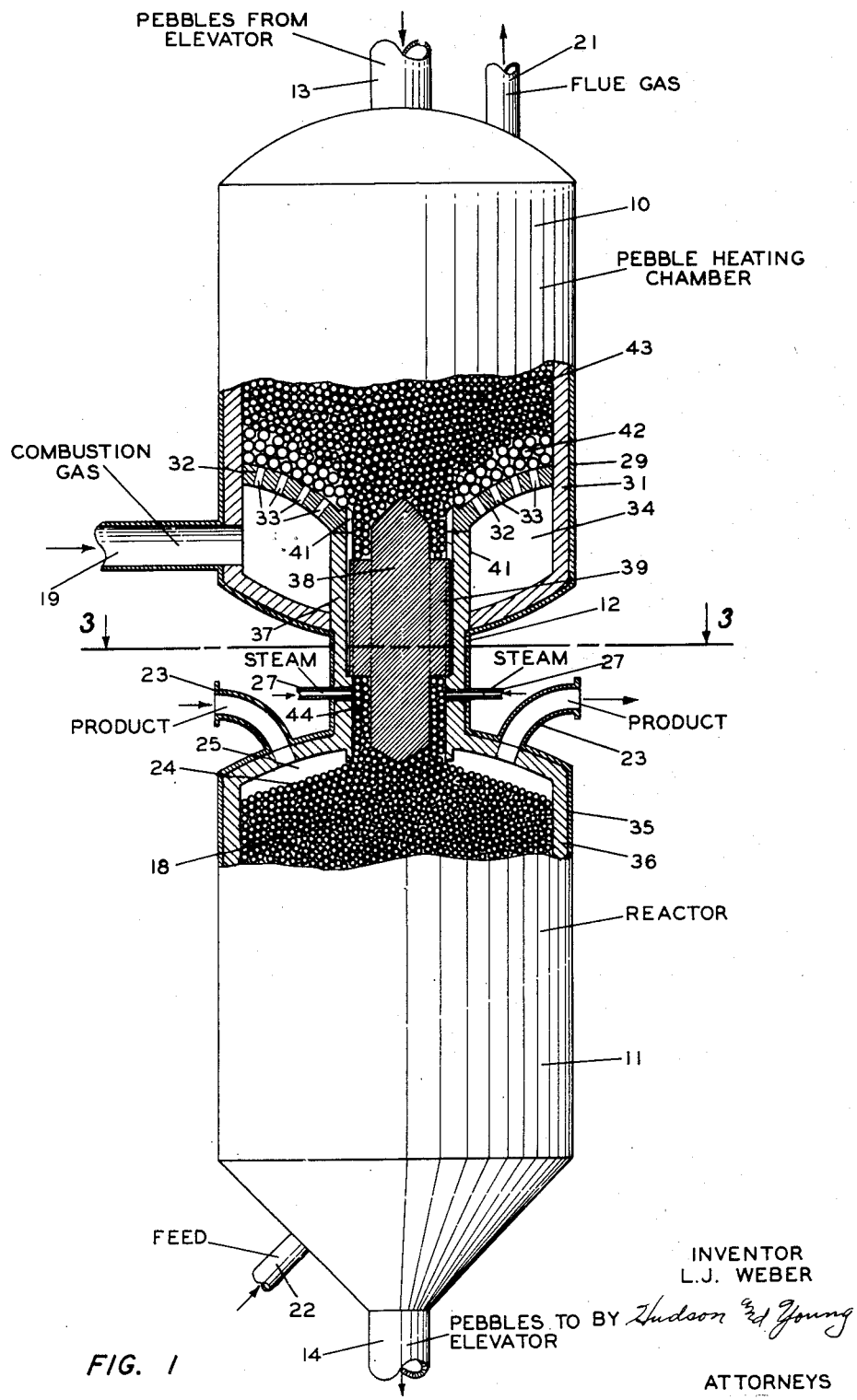
Figure 1 is an elevational view partly in section of an arrangement of apparatus illustrating the invention.

To illustrate pebble heater operation, reference is made in detail to Figure 2 in which 10 is an insulated refractory lined pebble heating chamber and 11 is an insulated refractory lined reaction chamber, the two chambers being connected by throat 12 for flow of pebbles from the upper to the lower of said two chambers. Conduits 13 and 14, in chutes 15 and 16, respectively, together with elevator 17, constitute means for transferring pebbles from the pebble outlet in the reactor 11 to the pebble inlet in heater 10. Pebbles are heated in heater 10 to a desirable temperature above a predetermined reaction temperature to be maintained in reactor 11 by hot gases introduced thru line 19 and taken off thru line 21. Hot pebbles descend thru throat 12 into reactor 11 forming a slowly descending bed of pebbles 18, having a sloping top surface 24, determined by the angle of repose of the pebbles. A desirable feed gas is admitted to reactor 11, thru line 22 and effluents from the reactor are withdrawn thru line 23. It will be noted that throat 12 extends into reactor 11 a short distance providing vapor space 25, above the pebble bed. Lines 26, 27 and 28 admit steam or other blocking gas to prevent escape of gases thru the conduits to which these lines lead.

Pebble heater apparatus is designed to operate continuously, the pebbles being continuously elevated from chute 16 to chute 15 by elevator 17 and introduced to the heater thru conduit 13. In conventional apparatus throat 12 is designed relatively narrow in relation to heater 10 and reactor 11. Hence pebble bed 18 has a top surface approaching that of a cone whose sides form an angle of approximately 35° with the horizontal depending upon the angle of repose of the particular pebbles being used. This means that the path of the gas being treated in the reactor is shorter near the periphery of the reactor than it is near the center. My invention cuts off the conical top much closer to the base and improves the uniformity of flow of gases thru the pebble bed in the reactor.

Referring to Figure 1, 10 is a pebble heating chamber having a metal shell 29 and a refractory lining 31. Insulating material may be disposed between the metal lining and the refractory lining for prevention of heat losses by conduction to the shell. Numeral 32 designates an arched refractory having holes 33 and forming an annular space 34 for combustion gases which pass thru holes 33 into the pebble bed in the heating chamber. A combustible gas is supplied thru line 19 and flue gas exits thru stack 21 after contacting and heating pebbles 43.

Numeral 11 denotes a reactor having a metal shell 35 and a refractory lining 36 and enclosing a bed of pebbles 18. The gas to be treated is admitted thru line 22 and the treated gas or products of the reaction are removed from the reactor thru lines 23. Throat 12 has a refractory lining 37 extending into reactor 11 a short distance, thereby forming vapor space 25 above pebble bed 18. Numeral 38 refers to a throat plug having at least a pair of supporting fins 39, engaging slots 41 in the refractory forming the lining of the pebble passageway from chamber 10 to chamber 11. Throat plug 38 being of smaller diameter than the inside diameter of throat 12 forms an annulus 44 for the flow of pebbles from the upper to the lower chamber.

While throat 38 is desirably approximately as long as the throat, it may be considerably shorter since in shorter form it still functions to block the flow of gas between chambers and to assist the blocking gas admitted thru lines 27, in preventing the flow of gases thru the annulus in which the pebbles flow. Fins 39 should be sufficiently long to offer firm support to the plug and preferably should not extend to the lower end of the plug, in order to form a complete annulus below the fins thru which blocking gas may be admitted. If a plug or core utilizing three or more fins is used, a blocking gas may be admitted to each segment between fins or to the annulus below the fins. Slots 41 are open on the upper end for easy insertion or removal of plug 38. Plug 38 is preferably molded or cast in one piece from relatively pure aluminum oxide or from silicon carbide, which are well recognized as super refractories. Other suitable materials may be used in the construction of plug 38 as well as other modes of construction.

A bed of relatively large refractory aggregates 42 is disposed above refractory arch 32 in order to prevent the plugging of holes 33 with pebbles and to permit gas to pass thru these holes into the heating chamber. Pebbles 43 flow freely thru the throat, while the bed of aggregates 42 remain stationary. Pebbles enter the heater thru conduit 13 from an elevator not shown and pass from the reactor thru conduit 14 to said elevator.

Figure 3 shows plug 38 in concentric alignment with throat lining 37. Fins 39 engage slots 41 to support plug 38 and hold it in alignment. Annulus 44 permits free flow of pebbles between the plug and throat lining. The relation between the diameter of throat plug 38, diameter of the throat opening, and the diameter of the reactor within practical limits has been set forth hereinbefore. A relationship must be chosen in designing a unit for a specific process to provide sufficient annular space 44 (Figure 3) to permit sufficient flow of pebbles therethru to supply the maximum heat requirements of the process when operating with reasonable temperature differentials between the pebble stream and the gas stream.

My invention is applicable to all gas-solid contact operations at high temperatures in pebble heater apparatus but is particularly applicable to hydrocarbon cracking processes because of the more careful control of contact time afforded thereby. The leveling or flattening effect on the top surface of the pebble bed attributable to the wider throat permits more nearly equal contact time for gases in the pebble bed and facilitates obtaining higher yield of olefins from cracking paraffin rich gases. Likewise, the more effective seal between chambers provided by the annulus in the throat and more uniform flow of pebbles thru the heating chamber add to the efficiency of a pebble heater installation designed according to my invention.

Various modifications of the invention will become apparent to those skilled in the art. The illustrative details disclosed are not to be construed as imposing unnecessary limitations on the invention.

I claim:

1. In combination, a pebble heating chamber having a gas inlet, a gas outlet, a pebble inlet in the upper portion, and a pebble outlet in the lower portion; a gas treating chamber positioned below said pebble heating chamber having a gas inlet in the lower portion, a gas outlet in the upper portion, a pebble inlet in the upper portion and a pebble outlet in the lower portion; a connecting throat of lesser horizontal cross section than either of said chambers in communication with the pebble outlet in said pebble heating chamber and the pebble inlet in said gas treating chamber; and a body in said throat centrally positioned with respect to said cross section and providing a pebble passageway between said body and the walls of said throat, said body extending a substantial distance in said throat and being in fixed relation therewith.

2. In combination, a pebble heating chamber having a gas outlet and a pebble inlet in the upper portion and a gas inlet and a pebble outlet in the lower portion thereof; a reaction chamber positioned at a lower level than said pebble heating chamber having a gas outlet and pebble inlet in the upper portion and a gas inlet and pebble outlet in the lower portion thereof; a refractory-lined throat connecting the pebble outlet of said heating chamber and the pebble inlet of said reaction chamber, said throat being of narrower horizontal cross section than either of said chambers and having a plurality of vertical slots in said refractory lining extending to the upper end of said throat but only a substantial part of the distance to the lower end thereof; and a centrally-positioned elongated body in said throat of lesser cross section than said throat having a plurality of fins thereon which engage said slots to hold said body in upright position thereby forming an annulus between said body and said throat for relatively free passage of pebbles therethru.

3. Pebble heater apparatus comprising a pair of closed refractory-lined cylindrical chambers disposed one above the other and connected by a cylindrical refractory-lined throat of lesser cross section, supply and discharge means leading to and from each of said chambers for flow of gases thereto and therefrom, a pebble inlet in the upper portion of the upper chamber, a pebble outlet in the lower portion of the lower chamber, a plurality of grooves in said throat lining extending downwardly from the upper end thereof, a finned generally cylindrical member axially positioned in said throat by engagement of said fins with said grooves to form an annular space with said throat lining extending substantially to the lower end of said throat thereby providing an annular passageway for pebbles to descend therethru.

4. Pebble heater apparatus comprising a pair of cylindrical closed chambers disposed one above the other and connected by a cylindrical throat of lesser diameter than said chambers for passage of pebbles from the upper to the lower of said chambers, supply and discharge means leading to and from each of said cambers for flow of gas thereto and therefrom, means for admitting pebbles to the upper portion of said upper chamber, means for withdrawing pebbles from the lower portion of said lower chamber, a generally cylindrical member of lesser diameter than said throat axially positioned in said throat and extending a substantial distance therein, and means for supporting said member in said throat in fixed relation therewith thereby providing an annular pebble passageway through a substantial part of said throat.

5. In apparatus for conducting high temperature reactions in vapor phase by contacting the vapors to be reacted with a descending contiguous mass of hot ⅛" to 1" pebbles, the combination of an upper closed cylindrical chamber enclosing a contiguous mass of pebbles; a pebble inlet and combustion gas outlet in the upper portion of said upper chamber; a combustion gas inlet in the lower portion of said upper chamber; a lower closed cylindrical chamber enclosing a contiguous mass of pebbles; a pebble outlet and a gas inlet in the lower portion of said lower chamber; a gas outlet in the upper portion of said lower chamber; a cylindrical throat of lesser diameter than said upper and lower chambers forming a pebble passageway between said chambers; a generally cylindrical throat plug of substantially smaller diameter than said throat axially positioned therein and extending along a substantial portion of the length of the throat forming an annular space between said plug and said throat, said space being filled with a contiguous mass of pebbles joining the aforementioned pebble masses into one contiguous column; and means for supporting said throat plug in said position.

6. The apparatus of claim 5 further characterized in that said throat plug is of a diameter in the range of from about $\frac{1}{10}$ to about ½ of the inner diameter of said lower chamber and said annular space is from 3 to 20 pebble diameters wide.

7. In a throat of restricted cross-section connecting a pair of chambers positioned one above the other for flow of a contiguous mass of particulate contact material downwardly therethru, a plug of smaller cross section than said throat positioned so as to form a symmetrical space between said plug and said throat for flow of contact material therethru, said plug extending a portion of the length of said throat, and means for supporting said plug in said position.

8. In a cylindrical refractory-lined throat of restricted cross-section connecting an upper pebble heating chamber and a lower conversion chamber arranged for gravity flow of pebbles therethru, a generally cylindrical throat member of a smaller diameter than said throat axially positioned therein to provide an annular space between said throat lining and said throat member of sufficient cross section to permit relatively free flow of pebbles therethru, and means for supporting said throat member in said position comprising a plurality of fins on said throat member engaging grooves in said throat lining.

9. In a process involving the steps of heating a contiguous descending mass of pebbles in an upper heating zone and contacting the resulting descending hot contiguous mass of pebbles in a lower zone with a stream of gas to be treated wherein said pebbles flow thru an interconnecting zone of restricted cross-section, the step of flowing the descending mass of pebbles from the upper to the lower zone thru an annular zone of sufficient cross section to permit relatively unrestricted flow of pebbles therethru, said annular zone having a smaller outer diameter than either of the first named zones.

LOUIS J. WEBER.

REFERENCES CITED

The following references are of record in the file of this patent:

UNITED STATES PATENTS

| Number | Name | Date |
|---|---|---|
| 2,389,636 | Ramseyer | Nov. 27, 1945 |
| 2,398,954 | Odell | Apr. 23, 1946 |